United States Patent
Selander et al.

(10) Patent No.: US 8,272,063 B2
(45) Date of Patent: Sep. 18, 2012

(54) DRM SCHEME EXTENSION

(75) Inventors: Göran Selander, Bromma (SE); Rolf Blom, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 181 days.

(21) Appl. No.: 12/668,261

(22) PCT Filed: Jul. 10, 2007

(86) PCT No.: PCT/SE2007/000678
§ 371 (c)(1),
(2), (4) Date: Oct. 13, 2010

(87) PCT Pub. No.: WO2009/008781
PCT Pub. Date: Jan. 15, 2009

(65) Prior Publication Data
US 2011/0023124 A1 Jan. 27, 2011

(51) Int. Cl.
*G06F 7/04* (2006.01)
*H04N 7/167* (2006.01)
(52) U.S. Cl. .......................... 726/26; 380/201
(58) Field of Classification Search ............ 726/26; 380/201
See application file for complete search history.

(56) References Cited

U.S. PATENT DOCUMENTS

| | | | |
|---|---|---|---|
| 2004/0205150 A1* | 10/2004 | Shibasaki | 709/217 |
| 2005/0084240 A1* | 4/2005 | Faisy | 386/83 |
| 2005/0091683 A1* | 4/2005 | Sheynman et al. | 725/34 |
| 2007/0265932 A1* | 11/2007 | Im et al. | 705/26 |
| 2008/0027868 A1* | 1/2008 | Ljung et al. | 705/51 |

OTHER PUBLICATIONS

Iliev, A. An Armored Data Vault. Senior Honors Thesis, Department of Computer Science, Dartmouth College—Dartmouth CS Technical Report TR2001-400, Online, Jun. 1, 2001.

* cited by examiner

*Primary Examiner* — Techane Gergiso (57) ABSTRACT

A method for achieving a secure recording and storing of a recorded activity is based on an extended Digital Rights Management (DRM) system. A recording and storing procedure is initiated, in response to recognizing one or more triggers at a device hosted by a user equipment. On the basis of the one or more triggers a Rights Issuer is located, and a Recording and Storing Instruction (RSI) is retrieved from the RI, using an existing DRM standard. Based on the RSI, a trusted storage for storing the recorded activity is located, and one or more recording procedures, involving one or more recording equipments, are activated and managed by the device. Before the recorded content is forwarded to the trusted storage, a protected content is generated from the recorded content, according to content of the RSI.

20 Claims, 6 Drawing Sheets

DRM SCHEME EXTENSION

TECHNICAL FIELD

The present invention relates generally to a method and a device for securing the creation and storage of a digital recording. In particular, the present invention relates to a tamper-proof and user-friendly recording and storing mechanism based on an extended Digital Rights Management (DRM) concept.

BACKGROUND

In the society of today there are many situations where it would be advantageous to be able to reproduce details from a certain activity or area.

There is often a need to produce substantiated evidence of what actually happened in a certain location of a criminal activity to be able to tie a criminal to the act. However, people tend to be more reluctant to intervene or even witness against crimes committed or about to happen, out of fear of getting involved. There is also always the risk that an individual that have committed a criminal act, even if convicted, will retaliate after sentence is served. Witness protection programs are known to have flawed and very few are prepared to live with hidden identities. A technical replacement of a witness is a surveillance camera. Surveillance cameras are important instruments for deterrence and detection of crime, as well as in prosecution and conviction of criminal acts.

For legal reasons, however, the use of surveillance cameras is restricted. One reason for this is a conflicting requirement of personal integrity, wherein a ruling opinion among people in general is that they want to be able to move in public places, without being observed and recorded. As an example, surveillance cameras may be allowed on underground trains but not in waiting halls or streets in general. As a result, individuals with a criminal intention can easily avoid monitored areas, and in absence of means to produce substantiated evidence, they can continue with their criminal activity, since, the likelihood of getting punished is low. In addition, surveillance cameras are expensive solutions, especially if a large area is to be covered.

An alternative to the use of surveillance cameras is to rely on recordings made by individuals on site. While law enforcement employees may be prepared to take photos or to record a criminal activity on film, private persons may be reluctant to do that, since this type of activities may involve a risk of becoming the next target, either personally or the recording equipment.

For the same reason, people may defer from calling 911 in order to alert law enforcement personnel, since that will involve leaving personal details and location, as well as describing the situation. The alerting person in question may get the feeling that intervening involves a too high personal risk. Also considering the time for law enforcement to arrive to the crime scene, the person giving the report may be asked to remain in the area for further questioning. In addition, the person making the alarm call is likely to feel responsible for summoning the law enforcement and may therefore hesitate to such involvement in doubtful situations. Once the law enforcement arrives, there may also be considerable problems of providing evidence of what has actually happened on a crime scene. In short, there is presently little technical support to encourage law abiding citizens to assist in emergency or law violation situations.

Public alarm services, such as, e.g. dialing 911, are well known but suffer from the same limitations as presented previously.

Real-time, over-the-air media delivery services with a central network sender and peripheral receivers, e.g., TV broadcast to mobile phones, are also well known. The use of peripheral senders are less common but do occur, e.g. in health care scenarios where personal health information is sent to medical personnel over mobile networks. Health service, however, is a special service typically provided for certain individuals only. In addition, it has to be personalized and preconfigured before it can be used.

DRM normally represents a mechanism for controlling access to, and usage of, digital data, such as, e.g., software, music, movies or hardware, which may be implemented with any of several available technologies. A DRM mechanism may be used by content providers, publishers or copyright owners wanting to apply usage restrictions associated with a specific instance of a digital work. DRM extends beyond the physical delivery of content, offered by a provider, into managing a part of, or the complete content lifecycle. DRM is a vast area which may involve many different components, including asset management, such as, e.g. packaging, identification, encryption, watermarking and tracking, rights management, such as, e.g. rights creation, association to content, licensing, and other areas, such as, e.g. trading and payments. A deployment of a DRM system, with end-users, possessing rights to access or use the digital data on their own equipment, typically involves technical protection measures to prevent end-users from exceeding the access or usage rights, such as, e.g. cryptography, tamper resistant HW, software security etc. Cryptography is typically invoked when encrypting or integrity protecting the data during transport as well as, together with identification schemes, to ensure that the right content and license are used on a legitimate user equipment. HW support, such as tamper resistant DRM modules, is part of the legitimate user equipment to secure the identification of the user equipment, and together with software obfuscation, to secure the implementation of the DRM system.

A common implementation of a DRM system is the logical separation of content and associated rights. This enables the same content to be used for different sets of rights and a rights trading business model, where a Rights Issuer (RI) can package and sell or offer Rights Objects (RO) to particular data content for a specific legitimate user equipment or group of user equipments. More information of how to use DRM as described above can be retrieved from "DRM Architecture, Open Mobile Alliance, Approved version 2.0—3 Mar. 2006".

In particular, a weak point of any DRM system is the protection of DRM content forwarded to a user equipment, such as, e.g. a music/movie player or parser, where the data eventually must be available in clear text format to be able to be used. Various schemes for protecting DRM content, and especially for setting up a Security Association between the content provider and the user equipment, such as, e.g. the OMA DRM Rights Object Acquisition Protocol (ROAP), are known. OMA DRM ROAP is an authentication protocol that also transports the digital rights associated to a particular digital media, together with cryptographic keys to be used for decrypting the content and verifying the integrity of the rights.

Another field where it might be of interest to secure evidence of an activity is when two or more parties are to sign an agreement with each other. There are many situations where negotiating parties having made an agreement with each other may end up in a dispute over the binding force of the agreement. Digital declarations, used in the signing of an agreement may offer a more reliable way of legally verifying an agreement. One method for using such a digital declaration when signing an agreement is known from the patent application US 2004/0139344. This patent application describes a method to be used in order to strengthen the binding force of a digital declaration of an agreement, wherein characteristics, associated with a document, and digital recording information, associated with one or more signing parties are combined and stored for later retrieval. The method described in US 2004/0139344 includes the recording of an action, statement or capacity of an individual, made at the time of the declaration of an agreement made with a document. A link, linking the recorded content with characteristics from the document is Carried out by, e.g., a computer at the location of the individual. By storing the linked information, it is possible to retrieve the information at a later occasion, in order to verify that the agreement was correctly made by the participating individuals.

There are, however, deficiencies associated also with this application. Initially, the security of the recorded content can be questioned, both when considering the risk for tampering with a recording, as well as when considering the security of stored content, and the ability to keep the content out of reach for unauthorized individuals.

In addition, the procedure necessary for synchronizing a number of activities, involving a plurality of recording entities, may be complex, wherein a malfunction, or erroneous management at one step may jeopardize the binding force of the signing procedure, and the expected value of the proof of the recorded material.

SUMMARY

It is an object of the present invention to provide a tamper-proof and user-friendly recording and storing mechanism based on an extended Digital Rights Management (DRM) concept which will overcome at least some of the problems discussed above. Such a mechanism will provide a novel way of managing recording of an activity and of storing the recorded content at a trusted storage, offering a high level of integrity protection and security against tampering with the recorded content.

This invention provides, a method, and a device, to be carried by a user equipment, usable in cooperation with conventional DRM functionality.

According to an aspect of the present invention, a method is provided where a device, hosted by a user equipment, secures recording and storing of a recorded activity. The method comprises a first step of locating a rights issuer (RI) in response to recognising one or more triggers. In another step, recording and storing instructions (RSI) are retrieved from the RI. In a next step, a trusted storage for secure storing of recorded content is located, before a recording is activated and managed at least one recording equipment, according to content of the RSI. A protected content is generated from the recorded content, according to content of the RSI, and the protected content is transmitted to the trusted storage.

According to another aspect, one or more triggers may be initiated by, e.g. a pressing of a mechanical means, a selection of a menu option, an uttering of an expression and/or an activation of a sensor, an actuator and/or an alarm.

According to another aspect, the RSI retrieved from the RI may be selected in dependence on the one or more triggers and/or on additional data. The device may be authenticated by the RI, prior to providing an RSI from the RI to the device. The RSI may further comprise at least one cryptographic key, to be used when generating the protected content.

According to yet another aspect, the content of the RSI include specific instructions and executable instructions which are in dependence of data that has been determined by the device in the step of activating and managing a recording. The specific and executable instructions may depend on, e.g. the time of the day, the at least one trigger, the location of the device, the network performance, the load of the potential trusted storages or a user interaction.

According to yet another aspect, the trusted storage may be a storage of data, managed and controlled by an authorized entity, or it may be a storage of protected content, to which access is controlled by a DRM mechanism.

According to one aspect, a standardised protocol, such as, e.g. the OMA DRM Rights Object Acquisition Protocol (ROAP), may be used for delivery of the RSI to the device.

According to one aspect, a recording may comprise one or a combination of a video recording, a camera recording, an audio recording and/or a recording of at least one measured parameter. The recording may be activated, either instantly, or after a delay set according to a predetermined rule or at random. Meta-data may be added to the recorded content prior to forwarding the respective content to a trusted storage, wherein the meta-data may be a narrative text or voice message provided by a human, the user equipment time, the location logged by the user equipment, or a measured parameter. A measured parameter may be any of, e.g. a temperature, an acceleration, an elevation or an orientation of the user equipment hosting the device.

According to another aspect, user anonymity may be provided by the user's operator by removing the user/subscriber data associated with protected content, prior to forwarding it to the trusted storage. A binding between the user/subscriber identity and the destination address and/or the time of the recording may, however, be used by the operator to break the anonymity.

According to another aspect the method further comprises a step wherein a recorded content part is erased from the device when an indication, indicating that the respective content part has been successfully stored at the trusted storage has been received by the device.

According to yet another aspect, a device, implemented at a user equipment is provided, wherein the device is adapted to manage a secure recording and storing of an activity. The device comprises locating means, adapted to locate an RI in response to recognising one or more triggers. The device also comprises retrieving means for retrieving an RSI from the RI. The locating means is also adapted to locate a trusted storage, for secure storing of recorded content. In addition, the device comprises activating and managing means, which is adapted to activate and to record one or more recording equipments, according to content of the RSI. Protecting means of the device is adapted to be used for protecting content of the recording according to content of the RSI, and transmitting means of the device is adapted to transmit the protected content to the trusted storage.

According to another aspect, the locating means is further adapted to recognise one or more triggers, which may be initiated by, e.g. an activation of a mechanical means, a selection of a menu option, an uttering of an expression, an activation of a sensor, or an activation of an alarm. The protecting means is adapted to encrypt and/or provide for integrity protection of recorded content, using at least one cryptographic key retrieved from the RSI. The locating means may be adapted to locate a trusted storage from a plurality of trusted storages on the basis of, e.g. the time of the day, the at least one trigger, the content of the RSI, the location of the device, the network performance, the load of the potential trusted storages or a user interaction, alone or in a combination. The activation and determining means may be adapted to determine data on which specific instructions and executable instructions included in the RSI depend, while the activating and managing means may be, adapted to manage a recording comprising, e.g. a video recording, a camera recording, an audio recording and/or a recording of at least one measured parameter, alone or in a combination.

According to another aspect, the protecting means may further be adapted to add meta-data to the recorded content, prior to forwarding the content to a trusted storage, wherein the meta-data may be, one or more of, e.g. a narrative text or voice message provided by a human, the user equipment time, the location logged by the user equipment, and/or a measured parameter.

BRIEF DESCRIPTION OF THE DRAWINGS

The present invention will now be described in more detail by means of preferred embodiments and with reference to the accompanying drawings.

DETAILED DESCRIPTION

Briefly described, the present invention relates to a recording and storing mechanism which is based on an extended DRM mechanism, which is adapted to provide a secure way of making a recording, as well as of delivering and storing the recorded content at a trusted storage.

As explained above, the body of available Digital Rights Management (DRM) technology today is focused on securing content and controlling its usage from a content owners trusted environment to a rendering unit in a user equipment.

Figure 1:
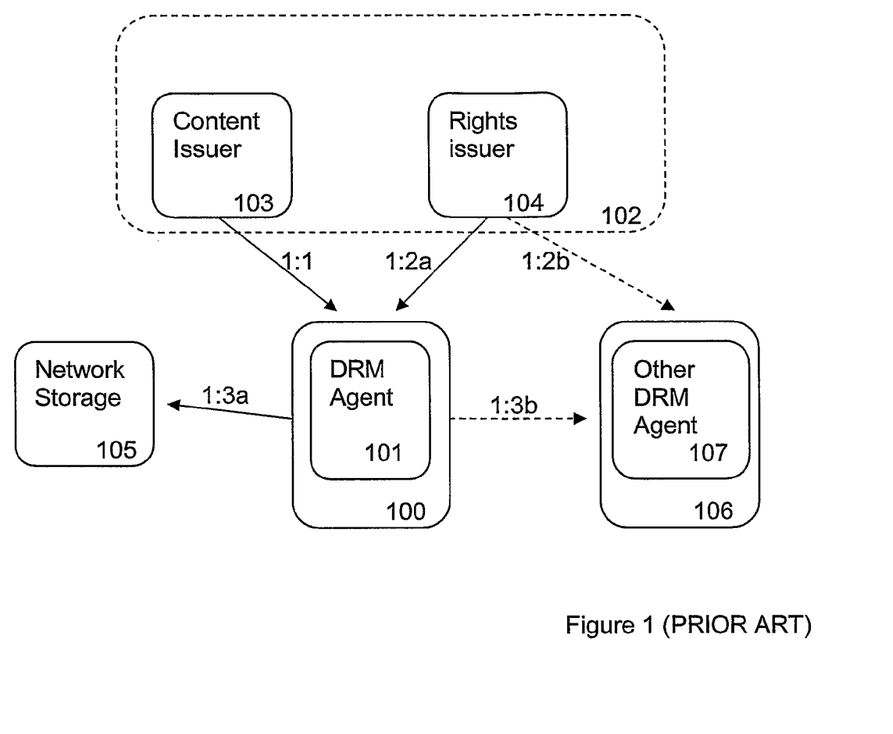
FIG. 1 schematically illustrates an architecture of a Digital Rights Management (DRM) system, according to the prior art.

A functional architecture of a DRM system according to the prior art will now be described with reference to FIG. 1. A user equipment 100, which may be stationary or mobile, comprises a trusted entity, referred to as a DRM agent 101. The DRM agent 101 is responsible for enforcing permissions and constraints associated with DRM protected content, and for controlling access to the DRM content, according to rules and constraints specified for the DRM content in a Rights Object (RO), provided from a content provider 102. Without the associated RO, a DRM content cannot be used by the user equipment 100. A user of the user equipment 100, may access DRM content, e.g. as a preview trial version or a full version, associated with some kind of restriction as to the use of the content, from a Content Issuer (CI) 103 of the content provider 102. Upon identifying content retrievable from the content provider as DRM content, the DRM agent 101 of the user equipment 100 is invoked. In a first step 1:1, a selected DRM content is forwarded to the DRM agent 101 from CI 103. The DRM content is encrypted with a symmetric content encryption key (CEK), and in order for the user of the user equipment 100, to get full access to the DRM content, the DRM agent 101 requests for a RO from a Rights Issuer (RI) 104 of the content provider 102 in a next step 1:2a. All DRM agents are provided with a unique cryptographic key pair and a certificate, which allows the content and rights issuer to securely authenticate a DRM agent, using any standard PKI procedures. In addition to rights information, the RO, which, e.g. could be an XML document, contain one or more cryptographic keys, and/or other data which might be needed to decrypt and verify the integrity of the DRM content. When the requesting DRM agent 101 has been authenticated, sensitive parts of the RO, such as, e.g. the one or more cryptographic keys, associated with the delivered DRM content are encrypted before delivery to the DRM agent 101. The RO, now cryptographically bound to the DRM agent 101, may be transported to the user equipment's 100 DRM agent 101, using any available transport mechanism. At the DRM agent 101, the DRM content is parsed, such that the associated DRM content can be rendered according to the usage rules and constraints specified in the RO.

DRM content can only be accessed with a valid RO, and so, DRM content may be freely distributed from one user equipment to other user equipments. This enables, for example super distribution, allowing users to freely pass DRM content between them. DRM Content delivered to the user equipment 100 may, e.g. be forwarded to, and stored in a Network Storage 105, such as, e.g., a removable media. This is illustrated with a step 1:3a. In a step 1:3b, DRM agent 101, distributes the retrieved DRM content to another user equipment 106, comprising another DRM agent 107. To be able to access the DRM content provided from user equipment 100, however, the DRM agent 107 of user equipment 106 has to request for a new RO from RI 104. This is done in an optional next step 1:2b. RI 104 authenticates the DRM agent 107 and determines whether an RO is to be provided to user equipment 106 and its associated DRM agent 107. If the RO is provided to DRM agent 107, also the user of user equipment 106 may gain access to the DRM content. Whether the DRM agent 107 gains full access or limited access to the DRM content all depends on the instructions of the retrieved RO, i.e. this RO may not necessarily be identical to the RO which was provided to DRM agent 101.

The present document focuses on an alternative way of using the DRM concept, described above. Instead of using DRM for assuring a provider that some content has been disposed in a legal way, wherein DRM is used for rendering data, we propose an extended DRM mechanism for recording, transmitting and storing media, such as video, one single- or a sequence of still pictures and/or audio in a secure and user friendly way. The extended DRM mechanism allows a user of a user equipment to trigger the user equipment to execute a recording and to transport the recorded content according to a context dependent recording instruction. By taking advantage of the known DRM functionality, the proposed extended DRM mechanism, which will be described in more detail below, can provide high security to the recorded content right from the initiation of a recording to the storing of the recorded content at a trusted storage. By coupling to a standard DRM system, the protection is extended from recording to rendering. This extended feature will be described further below.

In a particular embodiment targeting one scenario described above, the user triggers an "irreversible" recording. The desired feature is that an individual, initiating the recording can rest assure that no data will be retrievable or tampered with by any unauthorized, individual throughout the whole procedure. Access to content which has been recorded, transmitted to, and stored in a trusted storage is restricted, potentially even excluding the recording individual from being able to have any kind of access to a recorded content. An end-user, using the extended DRM mechanism for recording an activity, thus, will not own, nor have any control of the rights to the recorded media. Once stored in a secured storage, only authorized personnel, such as, e.g. law enforcement personnel, will be able to access the recorded content.

The proposed recording mechanism may be used for recording unexpected incidents on the fly, which, thus, may appear on short notice. By providing this type of service, offering, such a high level of security to the recording individual, the willingness to record incidents, such as criminal acts may rise considerably. Furthermore, only the knowledge that a mechanism, such as the one described above is in use among the public, may act as a deterrent for individuals having the intention of committing a criminal act.

In addition, the introduction of the proposed recording mechanism will provide a more reliable way of securing also any type of planned activity, wherein there is a desire for a secure storing of documentation. This may be applicable in situations where there is a desire to be able to access original documentation at a later occasion, and where one wants to be able to provide evidence that the document really is the same document as the one which was originally signed, such as, e.g., when securing the documentation of an inspection or when securing the signing of an agreement.

Another important aspect of the suggested recording mechanism is that it has to be easy to initiate, i.e., the triggering procedure which activates a recording should preferably require as little user-interaction as possible.

Figure 2:
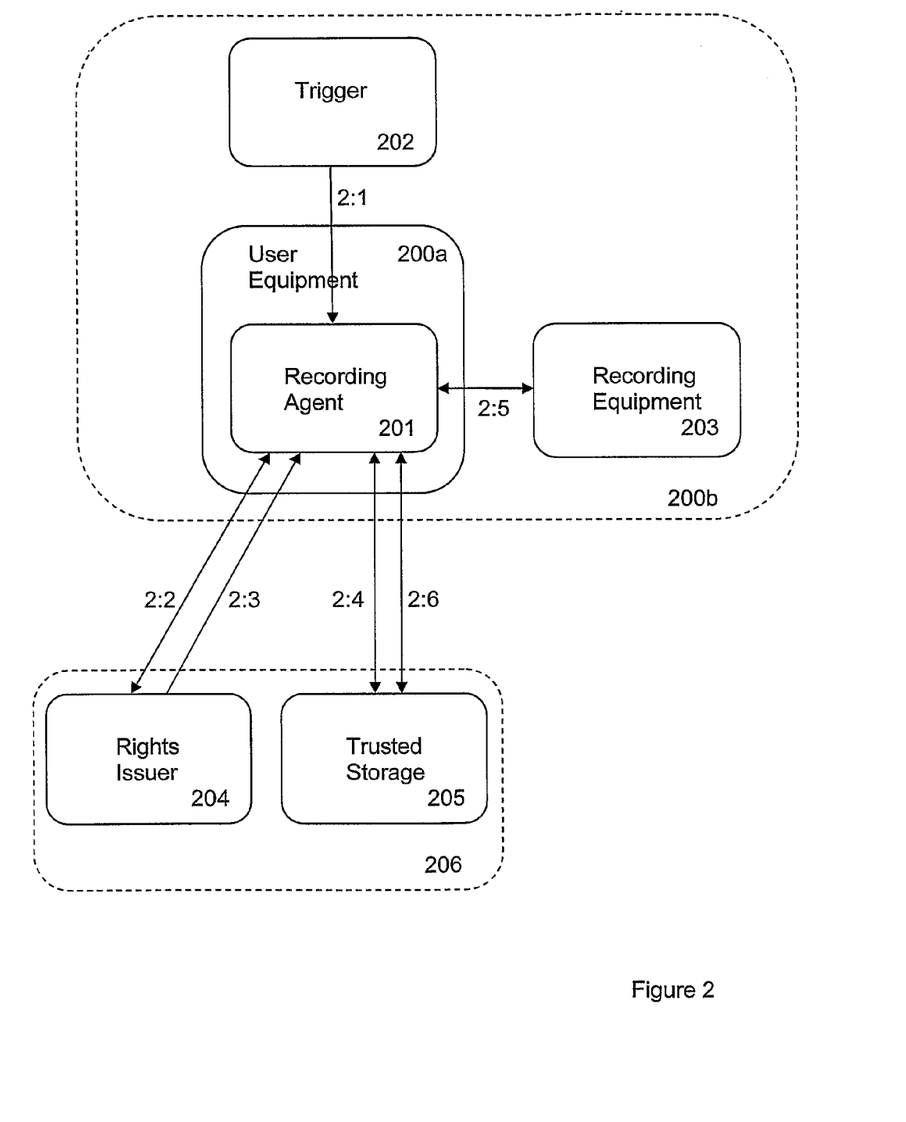
FIG. 2 schematically illustrates a system providing protected recording services, according to one embodiment.

A general description of the extended DRM recording mechanism will now be given with reference to FIG. 2, illustrating a user equipment 200a, comprising a device, denoted a recording agent 201, which is adapted to manage a procedure for recording and storing an activity in a secure manner, in accordance with what has been described above. The recording agent 201 may be a conventional DRM agent provided with additional logic, adapted to provide recording facilities according to one embodiment of the claimed invention to the user equipment 200a, or a separate recording agent, dedicated for the management of a secure recording. The user equipment 200a, which may be a stationary, or a portable user equipment, is connected to a trigger 202, and a recording equipment 203, which can be managed by the recording agent 201 in response to a recognition of a trigger indication by the recording agent 201. The recording equipment 203 preferably comprises an auto-configured recording function, which may be implemented during manufacturing, adapted to operate in response to instructions provided to the recording equipment 203 from a Rights Issuer (RI) 204.

Although only equipped with one trigger 202, and one recording equipment 203, it is to be understood that, alternatively, there may be two or more recording equipments connected to the user equipment 200a and the associated recording agent 201. It is also to be understood that the suggested recording agent 201 may be configured to be activated by two or more triggers, wherein the activation of logic of the recording agent 201 may depend on one trigger at a time or a combination of different triggers. The logic may also be arranged to initiate different activities, or chains of activities depending on which of a plurality of different triggers, or of a combination of triggers, that have been activated.

An alternative to the user equipment 200a, being Connected to an external trigger 202, and an external recording equipment 203, is illustrated with 200b, wherein the alternative user equipment 200b is provided as an integrated entity, comprising an integrated trigger 202, as well as an integrated recording equipment 203. It is also to be understood that a combination of integrated and distributed entities easily can be provided in different alternative embodiments, wherein the respective entities may communicate with each other via any type of conventional wired or wireless communication protocol.

In FIG. 2, trigger 202 activates the recording agent 201 in a first step 2:1. Logic of the recording agent 201 is configured to recognise the trigger as an instruction to start a protected recording procedure. The protected recording procedure will be specified by a Recording and Storing Instruction (RSI), which is a specific type of Rights Object (RO), retrievable from an RI 204 of a services provider 206, providing protected recording services. A trigger or, alternatively, a combination of triggers, thus, will instruct logic of the recording agent 201 to locate an RI 204 of one or more available RIs, and to request for an RSI, associated with a specific recording procedure. Apart from comprising specific instructions and executable instructions for the execution of one or more recording procedures, the RSI typically comprises instructions for how to locate, and if there are a plurality of storage means, how to select a storage, i.e. the terminating entity of a trusted recording and storing procedure. In addition, the RSI comprises the one or more cryptographic keys, necessary for providing a required security level to the proposed trusted recording and storing procedure, e.g. for encrypting and/or integrity protecting the recorded content before it is transported to the selected storage.

A trusted recording service, thus, may be offered as one standard recording procedure or as a variety of different recording procedures, each of which may be adapted for different situations and demands. The respective RSI is requested for in a step 2:2, wherein the request comprises at least a (stochastically) unique identifier of the user equipment, recording agent or any other identifier, credential, certificate etc. that is associated to the cryptographic key of the user equipment or recording agent. The RI 204 authenticates the claimed identity of the recording agent by means of an authentication protocol which may consist of one or several message exchanges between the RI 204 and the recording agent 201. Once authenticated, an RSI is selected on the basis of the respective one or more triggers, and possibly also on the basis of the logic of the recording agent 201. Before delivered to the recording agent 201, all or sensitive parts of the RSI are encrypted and/or integrity protected as appropriate for the recording agent 201, in accordance with any conventional DRM mechanism. In addition, RI 204 may sign the RSI digitally. An RSI, which is hereby cryptographically bound to the recording agent 201, is then delivered to the recording agent in a step 2:3. A secure, standardised protocol, such as, e.g. the OMA DRM ROAP, may be used for authentication and delivery of RSI, as described above. It is to be understood that any of a number of known encryption and/or integrity protection mechanisms and/or other information security techniques may be used for this purpose. The security details will not be discussed any further in this document.

The logic of the recording agent 201, recognises the content of the RSI as rules and constraints for activating a specified trusted recording procedure at the recording equipment 203. In one embodiment, the logic of the recording agent 201 may be based on fairly simple pre-configured instructions, relying on detailed instructions, specifying the management of a trusted recording procedure. In another, alternative embodiment, however, the recording agent 201 may comprise detailed, recording instructions, which rely only on a few situation dependent instructions, delivered with a respective RSI. The managing of a trusted recording procedure, thus is determined by an interaction between data determined by the recording agent 201 and instructions of the respective RSI. Such an interaction may depend on one or more parameters, such as, e.g. the time of the day, the at least one trigger, the location of the recording agent, the network performance, the load of the potential trusted storage, or a user interaction.

The instructions for managing a trusted recording procedure may be adapted to operate according to different circumstances, e.g. a recording may be configured to continue as long as a keyboard key is pressed, or to continue as long as the batteries of the user equipment 200a, 200b allows it.

Before a recording procedure is initiated, a trusted storage 205 has to be located. The trusted storage 205 should, under the current circumstances, be under the supervision of an organisation or authority which is considered trustworthy by the end-user. In one embodiment, the trusted storage may be located on the basis of the logic of the recording agent 201 and/or on the basis of an instruction of the respective RSI. In another embodiment, the relevant trusted storage may be determined on the basis only of the respective trigger or combination of triggers. When, e.g. triggering a recording of a suspected criminal activity, the trusted storage preferably is administered by the police department, a local police office or a trusted organisation. In case of signing an agreement, the trusted storage 205 may instead be managed by an authorized notary public. Both the RI 204 and the trusted storage 205 are typically located at the premises of the trusted recording services provider 206, but may also be distributed, and even controlled by different responsible authorities.

Once located, a path, or any other transport specification is set-up between the recording agent 201 and the trusted storage 205. This is illustrated with a next step 2:4. From the moment a recording procedure has started until it is stored in the trusted storage 205, the proposed trusted recording functionality will provide protection of the recorded content from access from any party, due to the cryptographic protection provided by the trusted recording mechanism.

With a path or other transport specification established, the recording agent 201 activates a trusted recording at recording equipment 203 on the basis of the content of the RSI, possibly in combination with data determined by the recording agent 201, as illustrated in a next step 2:5. The recording is managed by the recording agent 201, instructing the recording equipment 203 how and when to record an activity. Recorded content is forwarded to the recording agent 201, where it is protected, to avoid eavesdropping and tampering with the content. The sending side is using the cryptographic keys and other information obtained during previous steps and/or additional information for encrypting and integrity protecting the media, e.g. by using PKCS (Public Key Cryptographic Standards) #7 to protected still photos, or SRTP (Secure Real-Time Protocol) to protect video streams, etc. thereby restricting access to the legitimate entities and enabling detection of manipulation attempts during transmission. Typically the protected content is buffered in a dedicated buffering means (not shown) of the recording agent 201, before it is delivered to the trusted storage 205 on the selected path in a step 2:6.

Any data network or transport service may be applicable for the delivery of content to the trusted storage, e.g. streamed video or audio, may be transported using the Real-time Transport Protocol (RTP) over UDP and IP, while photos may be delivered using the File Transfer Protocol over TCP and IP. Other media formats may be applied for supplying time stamped information such as SMIL.

A symmetric key may be stored in the recording equipment 203 for later forensics to prove that this user equipment did make a specific recording. It should be noted that knowledge of the recording equipment 203, even to the extent of being able to authenticate and deem it as legitimate, does not imply any knowledge of the user performing the recording.

In another exemplary embodiment, the sender, as well as the receiver, may execute a protocol whereby the sending side may perform blind signature operations to enable anonymity of the sender.

Due to the protection mechanisms described above, the network operator of the network would typically not have access to the recorded content. The network operator can, however, normally identify and log the sender and the receiver of a transmission of information, as well as the time of the transmission. The log may contain information about IP addresses or mobile phone subscriptions, which may give some information about the user. Due to a professional secrecy, such information is generally not accessible by any other party. User anonymity may be provided by the user's operator by removing the user and/or subscriber data from the content transmitted to the trusted storage.

In the exceptional event of lawful interception (LI), which may only be employed under certain juridical circumstances, this information, however, can be disclosed to an authorized authority, such as, e.g. the police, and, thus, used to break the user anonymity.

Optionally, any additional information, such as, e.g. narrative text or voice messages, provided by a human, time, location logged by the recording equipment, and/or other measured parameters, such as e.g. temperature, acceleration, elevation or orientation of the user equipment 400, may be attached to the recorded content and stored together with the content as additional meta-data.

The trusted storage 205 may gradually indicate a successful reception and storage of delivered content to the recording agent 201, after which the respective successfully delivered and a stored content part is erased from the recording agent 201, thereby leaving no trace of the trusted recording at the user equipment when the complete recording scene has been forwarded to the trusted storage 205. This indication information is typically integrity protected to avoid the risk of accidental or malicious caused removal of recorded content and associated data.

The trusted storage 205 may also be adapted to generate a message to one or more specified addresses, informing of a successful reception of trusted content, instantly making e.g. an authority aware of the new content. An exemplary user equipment 200b adapted to provide a secure recording and delivery of an activity according to the embodiment described above will now be presented in further detail with reference to FIG. 3.

Figure 3:
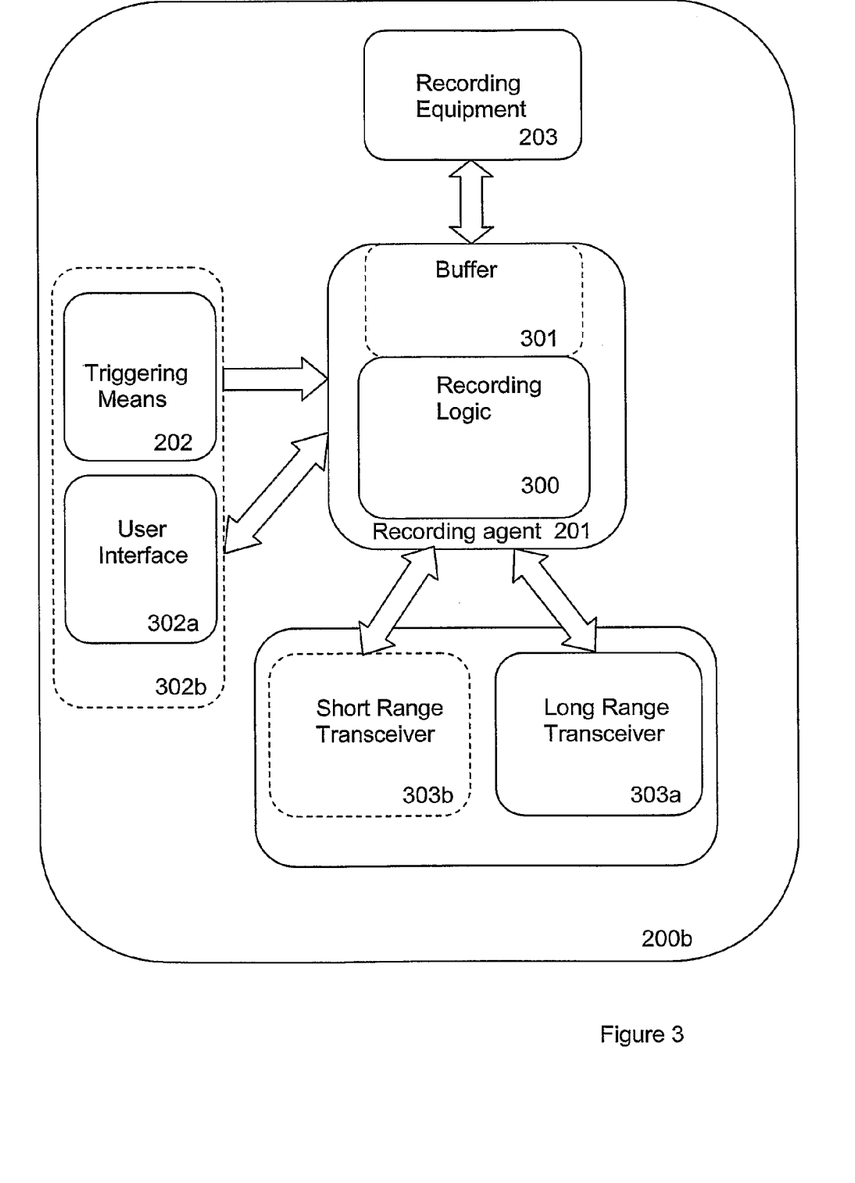
FIG. 3 schematically illustrates a user equipment adapted to be used in the system described with reference to FIG. 2.

The user equipment 200b illustrated in FIG. 3 comprises a recording agent 201, provided with Recording Logic 300, adapted to recognise one or more triggers and RSIs, and to manage a trusted recording and storing procedure on the basis of the information retrieved from one or more triggers and the associated RSI. Typically, the recording agent 201 also comprises a dedicated buffer 301, adapted to buffer recorded content, received from a recording equipment 203.

The recording equipment 203, which is adapted to be managed by the recording agent 201 via instructions of an RSI, may be any of, e.g. a still picture camera for recording one or more still pictures, a video camera for recording a film sequence, a microphone for recording audio, a sensor for recording a physical parameter, or any type of recording entity, controlled by an actuator.

The user equipment 200b also comprises a triggering means 202, which is adapted to provide one or more triggers to the recording logic 300, either from a mechanical activation, initiated by a user, or from an activation of a sensor or an actuator. Alternatively, a sensor or actuator may be implemented as parts of an alarm, operating as a triggering means, wherein the alarm may be sensitive to any one or more measurable parameter, such as, e.g. movement, position, temperature, level, light or sound.

Typically the user equipment 200b is provided with a mechanical means, such as, e.g. a key of the keyboard of the user equipment 201 dedicated for initiation of a trusted recording, allowing a recording procedure to start simply when the dedicated key is pressed. Another alternative solution is to provide a menu option, from which a selected option easily can be selected by the user. A third option is to provide the user equipment 200b with means, such as, e.g. a microphone, adapted to recognise a predetermined uttering of an expression as a command to start the proposed recording procedure.

A conventional user interface, comprising a keyboard, microphone, loudspeaker and display, and, optionally, also a touch screen, as well as other alternative means, is illustrated with 302a. The triggering means may be a part of the user interface, if the conventional keyboard, touch screen and/or microphone of a user equipment are used also for the described trusted recording purpose. Such an alternative user interface is represented with 302b in the figure.

In order to provide a secure storage of recorded content, the user equipment is normally provided with a separate means 303a for long range transmission. Such means may comprise conventional communication means for cellular communication such as, e.g. GSM, UMTS, WIMAX or fixed communication, via, e.g. PSTN or the Internet. If the user equipment is adapted to communicate with one or more external triggers, and/or sensors, it may also be provided with means 303b dedicated for short range communication. Such an optional short range transceiver, may operate according with a communication protocol, such as, e.g. WLAN, Bluetooth, Zigbee or IrDa.

One important issue associated with the triggering of the proposed trusted recording procedure is that the risk of initiating a trusted recording procedure by mistake is low. Such a risk may be reduced by implementing a combined triggering mechanism. The combination of pressing a key and uttering a predefined word would for example diminish the risk of falsely initiation of a trusted recording considerably.

Figure 4:
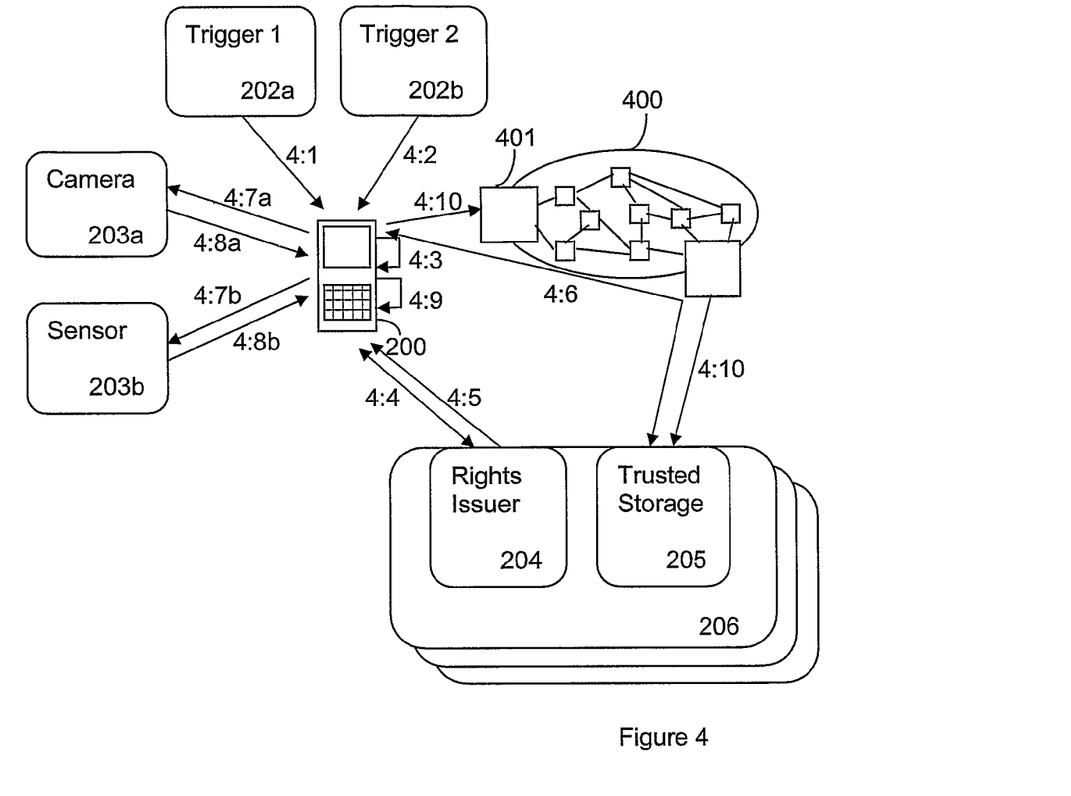
FIG. 4 illustrates an exemplified system providing protected recording services to a portable user equipment, according to one embodiment.

The claimed invention according to a first embodiment, providing trusted recording services to a user of a portable user equipment, will now be described with reference to FIG. 4. FIG. 4 refers to a trusted recording system adapted to provide secure recording and storing of a recorded activity for users provided with a wireless user equipment 200, such as, e.g. a cellular telephone, a personal digital assistant (PDA) or a wireless laptop, provided with the recording agent (not shown) described with reference to FIGS. 2 and 3. The recording agent of the wireless user equipment 200 is adapted to initiate a trusted recording procedure upon receiving a combination of trigger_1 202a, and trigger_2 202b, wherein trigger_1 may, e.g. be initiated by the user, pressing a dedicated key in a first step 4:1, while trigger_2 may be initiated by the user uttering a word, such as, e.g. "police", "accident" or "inspection", according to the present circumstances, in a second step 4:2. By predefining specific words, such a triggering procedure may provide one of one or more different trusted recording procedures, which are easy to initiate, and which are adapted to operate in an appropriate way. The triggering is rendered by 'logic of the recording agent in a next step 4:3, wherein an RI 204 is located and an RSI of the RI 204 is requested, in a step 4:4. When the recording agent has been authenticated by the RI 204, the requested RSI is delivered to the recording agent of the wireless user equipment 200 in a next step 4:5.

Once delivered to the recording agent, the logic of the recording agent interprets the content of the RSI, a trusted storage 205 is located and a path is set up between the recording agent and the trusted storage 205 of a trusted recording services provider 206 in a step 4:6, wherein both the path, as well as the trusted storage may be selected according to the content of the RSI, optionally in combination with one or more predefined criteria specified in the logic of the recording agent. The path may be set up via, e.g. a GSM or UMTS connection, wherein the conventional communication means of the wireless user equipment 200 is accessing a wireless network 400, e.g. the home network of the user, via an access node 401. It is to be understood that the communication between the wireless user equipment 200 and the rights issuer 204, represented by steps 4:4 and 4:5, and the trusted storage, represented by step 4:6 and 4:10 may be executed via the same path.

The trusted storage 205 may be any of a plurality of accessible storage means and may be pre-defined in the sense of a network address or other locator or destination information, which may be included in the RSI or retrievable by the logic from another destination. A particular important scenario is where the time of the day and location information, indicating the location of, e.g. the sending or recording equipment, is used to decide the relevant destination, e.g. during weekday's office hours, recorded media may be transferred to the neighborhood security guard, determined by the location of the user equipment, and outside office hours to the regional police office (also determined by the location of the user equipment) where there is 24 h attendance. Alternatively, the destination for the recorded media may be specified by a selected trigger or by a combination of triggers, such as, e.g. an "emergency trigger", a "traffic offence trigger", etc., and as a result, the media and other optional data may be routed to, e.g. a local police office, a local hospital or a traffic surveillance centre.

In addition to delivering recorded content to a trusted storage 205, the content may also be delivered to another authority server, which may be located, e.g. at the premises of the local hospital, a crisis centre or any other site where qualified personnel may be in need of important real-time or nearly real-time information of, e.g. the scene of an accident.

Next the recording logic initiates a trusted recording procedure by forwarding instructions, retrieved from the RSI to a camera 203a, and to a sensor 203b, which may be integrated with, or attached to, the wireless user equipment 200. These both means are then managed from the recording agent, according to the content of the retrieved RSI, until the trusted recording procedure is terminated. The initiation and managing of these both means are illustrated with the steps 4:7a and 4:7b, respectively, wherein the recording procedure may be set to start instantly, or after a delay, set according to a predetermined rule, or at random, all depending on what has been specified in the RSI, and possibly also depending on the configuration of the recording logic of the recoding agent.

The recorded content is forwarded to the recording agent in steps 4:8a and 4:8b, respectively. In the user equipment, the recorded content, which may be buffered in a dedicated buffer means (not shown), is protected according to the instructions of the RSI in a step 4:9. In a final step 4:10, the protected content is delivered to the selected trusted storage 205.

A system according to the embodiment described above is preferably adapted for situations wherein a portable user equipment is required for enabling an appropriate recording of the present situation. There are however situations where a portable user equipment will not be necessary for securing an activity. Such a scenario may occur when two or more individuals are to sign an agreement, e.g. on the premises of one of the respective individual.

Figure 5:
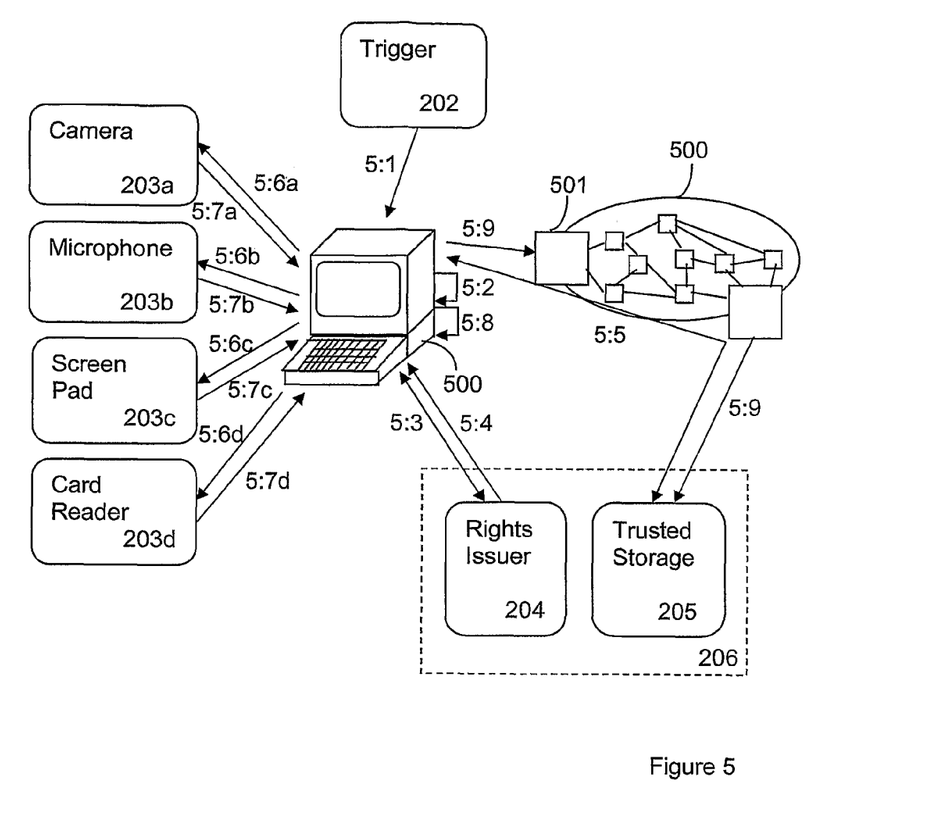
FIG. 5 illustrates an exemplified system providing protected recording services to a stationary user equipment, according to another embodiment.

A system adapted to operate in accordance with a second embodiment, comprising a stationary user equipment 500, which in this case is a PC, comprising a recording agent (not shown). The recording agent of PC 500 is adapted to activate a trusted recording procedure, upon recognising a single trigger 202, which may be activated by a user selection made from, e.g., a menu in a first step 5:1. Recording logic of the recording agent identifies instructions associated with the trigger in a step 5:2, which initiates a step 5:3 for retrieving an RSI, specified by the trigger, from an RI 204, of a content provider 206. RI 204 may be predefined or identified by the trigger. The recording agent is authenticated by RI 204 before the RSI is delivered to the recording agent in a next step 5:4. The recording logic interprets the instructions of the retrieved RSI, a trusted storage is located, and a path is set up to the trusted storage over a network 500, via an access node 501 in a step 5:5. How to setup the path, and on what criteria to select a trusted storage 205, may depend on different criteria, as described previously in association with the description of the first embodiment. Once a path has been set up between a recording agent and a trusted storage 205, the next step to be taken by the recording logic is to activate a number of recording equipments 203*a,b,c,d*, connected to the stationary user equipment 500, wherein the recording equipments are adapted to register different types of data, such as, e.g. the signing of an agreement, as specified, by the trigger and by the content of the RSI, addressed by the respective trigger 202. In this exemplary embodiment, the different recording equipments 203*a,b,c,d*, which may be distributed recording equipments, connected to the stationary user equipment 500, or integrated with the stationary user equipment 500, comprises a camera 203*a*, such as e.g. a video or a still picture camera adapted to record the signing procedure, a microphone 203*b*, adapted to record what is said during the activity to be recorded, a screen pad 203*c*, adapted to register, e.g. a signing to be used for binding the participating individuals to the signed agreement, and a card reader 203*d*, adapted to read, e.g. a digital signature of a card. The steps indicating the forwarding of instructions to the recording equipments 203*a, b,c,d* are illustrated with steps 5:6*a,b,c,d*. This forwarding could be initiated by the recording logic directly upon rendering the retrieved RSI, or by menu logic, activated by a user of the stationary user equipment 200.

Content recorded by the respective recording equipments is successively delivered to the recording logic in the preceding steps 5:7*a,b,c,d*, where the recorded content is DRM protected in a step 5:8, and, typically also buffered in a dedicated buffer (not shown). In a next step 5:9, the recording logic manages delivery of the protected content to the trusted storage 205 over the selected path. Upon having retrieved and stored parts of the delivered content, a signalling connection may be used by the content provider 206 to indicate a successful storage to the recording agent, whereby the respective content part is erased from the buffer by the recording logic.

Figure 6:
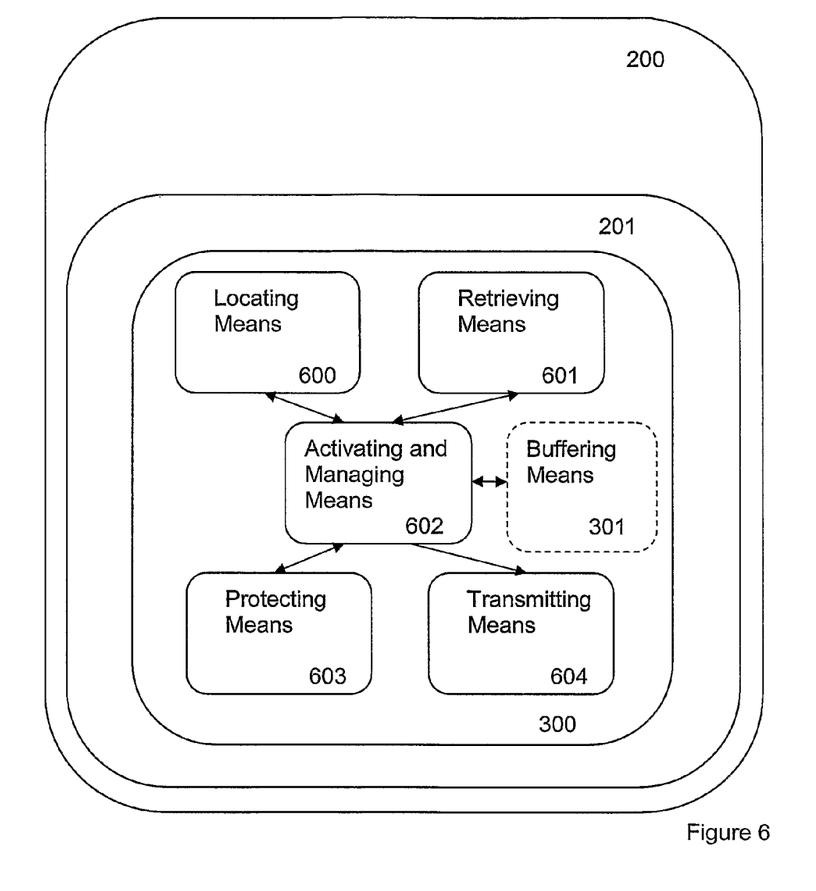
FIG. 6 schematically illustrates a recording agent 201, according to one embodiment, which is hosted by a user equipment 200.

A recording agent 201 hosted at a user equipment 200, according to one embodiment, will now be described with reference to FIG. 6. For simplicity, additional functions of the user equipment has been omitted in the figure. A recording agent 201 adapted to execute a trusted recording procedure according to any of the embodiments described above, typically comprises a recording logic 300, which may be separated into a number of interacting functions. According to this embodiment, the recording logic 300 comprises locating means 600, adapted to recognise one or more triggers which are set to trigger a trusted recording procedure, and upon having recognised the one or more triggers, to locate an appropriate RI (204). The locating means 600 is also adapted to locate a trusted storage after an RSI has been delivered to the recording agent 201. The RSI is retrieved by a retrieving means 601, which is implementing a retrieving protocol, such as, e.g. ROAP. Furthermore, an activation and managing means 602 is adapted to activate and manage a recording, managing one or more recording equipments to execute a trusted recording procedure in accordance with instructions of an RSI in combination with other data. A protection means 603 is adapted to protect recorded content, and, optional associated meta-data, before it is forwarded to a trusted storage. The protection means 603 typically comprises a dedicated HW- and/or SW-based cryptographic module for achieving accelerated handling of the cryptographic functionality. The recording agent 201 according to the described embodiment also comprises a transmitting means 604, which is adapted to provide a secure transmission of trusted content, making use of the transmitting functionality of the user equipment, hosting the recording agent 201. The recording agent may also comprise a buffering means 301, for buffering of recorded content.

By giving the term "trusted storage" a different interpretation than above we will get alternative versions of the two embodiments presented so far.

Communication security can be obtained in at least the two following alternative ways, namely:

Information is protected during transport using security protocols, wherein the integrity/trustworthiness of the destination is relied upon to maintain the security of the information. Alternatively, the information itself is protected, and any reliable transport and storage technique is used for transportation and storage of the protected content.

The two first embodiments used the first communication security alternative to describe the notion of trusted storage. We will now present a partial embodiment using the second alternative.

In this third embodiment, the triggering, the requesting and the retrieval of RSI, as well as the location of a storage is done in the same way as in the first embodiment. Instead of verifying, decrypting and storing the content in clear text format at a trusted party, however, the content remains protected in storage, and, hence, it can be stored without confidentiality requirements. In this case the storage is placed in a public environment. Still, the information must be protected from accidental or malicious changes, which would be possible to detect, but not necessarily possible to recover from.

As mentioned before, this mode of operation is based on known DRM technique. According to the third embodiment of the invention, we use DRM technique, not only to retrieve the RSI, but also to control the rendering of the content.

Upon request, the RI generates an RSI, which contains the cryptographic keys with which the content will be protected. The same keys are in this third embodiment used by the RI when generating ROs to authorize users of the content.

In this way, different categories of users can get access to different parts of the content, e.g. in case of an accident, the police could get other information than what is accessible for medical expertise. When looking at another scenario with a stored filming from a court, a journalist may be allowed to use an audio recording, whereas a police officer has full access to the stored material.

The RI can already at the time of request of the RSI prepare ROs for designated groups of users, using e.g. OMA Domain ROs, which provides users in the same Domain access to the same content. The RI can design the RSI and the ROs to fit the expected users and/or the present situation. In a situation of emergency, additional recording equipments may e.g. be activated to quickly collect as much information from a selected scene as possible.

While the invention has been described with reference to specific exemplary embodiments, the description is in general only intended to illustrate the inventive concept and should not be taken as limiting the scope of the invention.

The invention claimed is:

1. A method for securing recording and storing of a recorded activity, comprising the steps of:
   locating a Rights Issuer in response to recognising at least one trigger,
   retrieving Recording and Storing Instructions (RSI) from the Right Issuer (RI),
   locating a Trusted Storage, for secure storing of recorded content,
   activating and managing a recording on at least one recording equipment according to content of the RSI,
   generating a protected content from the recorded content according to content of the RSI,
   transmitting the protected content to the trusted storage.

2. The method according to claim 1, wherein the at least one trigger is initiated by at least one of:
   pressing of a mechanical means, selection of a menu option, uttering of an expression, activation of a sensor, an actuator and an alarm.

3. The method according to claim 1, wherein the RSI retrieved from the RI is selected in dependence on the one or more triggers or additional data.

4. The method according to claim 1, wherein, prior to providing an RSI from the RI to the device, the device is authenticated by the RI.

5. The method according to claim 1, wherein the RSI further comprises at least one cryptographic key to be used when generating the protected content.

6. The method according to claim 1, wherein the content of the RSI includes specific instructions and executable instructions in dependence of data determined by the device in the step of activating and managing a recording.

7. The method according to claim 6, wherein the specific and executable instructions depend on at least one of: the time of the day, the at least one trigger, the location of the device, the network performance, the load of the potential trusted storages or a user interaction.

8. The method according to claim 1, wherein meta-data is added to the recorded content prior to forwarding the content to the trusted storage.

9. The method according to claim 8, wherein the meta-data is at least one of: a narrative text or voice message provided by a human, the user equipment time, the location logged by the user equipment, or a measured parameter.

10. The method according to claim 9, wherein the at least one measured parameter is at least one of: a temperature, an acceleration, an elevation or an orientation of the user equipment hosting the device.

11. The method according to claim 1, wherein user anonymity is provided by the user's operator by removing the a user or subscriber data associated with protected content prior to forwarding it to the trusted storage.

12. The method according to claim 1, further comprising the following step:
   erasing a recorded content part from the device, upon having received an indication that the respective content part has been successfully stored at the trusted storage.

13. A device implemented at a user equipment adapted to manage a secure recording and storing of an activity, the device comprising:
   means for locating a Rights Issuer in response to recognising at least one trigger,
   means for retrieving a Recording and Storing Instruction (RSI) from the RI,
   means for locating a trusted storage (205), for secure storing of recorded content,
   means for activating and managing a recording on at least one recording equipment according to content of the RSI,
   means for protecting content of the recording according to content of the RSI, and
   means for transmitting the protected content to the trusted storage.

14. The device according to claim 13, wherein the locating means is adapted to recognise at least one trigger which is initiated by at least one of: an activation of a mechanical means, a selection of a menu option, an uttering of an expression, an activation of a sensor, and an activation of an alarm.

15. The device according to claim 13, wherein the protecting means is adapted to encrypt and/or provide for integrity protection of recorded content using at least one cryptographic key retrieved from the RSI.

16. The device according to claim 13, wherein the locating means is adapted to locate a trusted storage from a plurality of trusted storages on the basis of at least one of: the time of the day, the at least one trigger, the content of the RSI, the location of the device, the network performance, the load of the potential trusted storages or a user interaction.

17. The device according to claim 13, wherein the activation and determining means is adapted to determine data on which specific instructions and executable instructions included in the RSI depend.

18. The device according to claim 13, wherein the protecting means is adapted to add meta-data to the recorded content prior to forwarding the content to the trusted storage.

19. The device according to claim 18, wherein the meta-data at least one of:
   a narrative text or voice message provided by a human, the user equipment time, the location logged by the user equipment, and a measured parameter.

20. The device according to claim 19, wherein the at least one measured parameter is at least one of: a temperature, an acceleration, an elevation or an orientation of the user equipment hosting the device.

* * * * *

UNITED STATES PATENT AND TRADEMARK OFFICE
CERTIFICATE OF CORRECTION

PATENT NO. : 8,272,063 B2
APPLICATION NO. : 12/668261
DATED : September 18, 2012
INVENTOR(S) : Selander et al.

Page 1 of 1

It is certified that error appears in the above-identified patent and that said Letters Patent is hereby corrected as shown below:

In the Specifications:

In Column 3, Line 14, delete "Carried" and insert -- carried --, therefor.

In Column 3, Line 54, delete "at least" and insert -- at at least --, therefor.

In Column 7, Lines 65-66, delete "Connected" and insert -- connected --, therefor.

In Column 12, Line 1, delete "by'logic" and insert -- by logic --, therefor.

In the Claims:

In Column 16, Line 6, in Claim 11, delete "the a" and insert -- a --, therefor.

In Column 16, Line 16, in Claim 13, delete "Issuer in" and insert -- Issuer (RI) in --, therefor.

In Column 16, Line 20, in Claim 13, delete "storage (205)," and insert -- storage, --, therefor.

Signed and Sealed this
Twentieth Day of November, 2012

David J. Kappos
*Director of the United States Patent and Trademark Office*